United States Patent
Scott et al.

(10) Patent No.: US 7,853,544 B2
(45) Date of Patent: Dec. 14, 2010

(54) SYSTEMS AND METHODS FOR AUTOMATICALLY CATEGORIZING UNSTRUCTURED TEXT

(75) Inventors: Eric D. Scott, El Cajon, CA (US); Katrina A. Rhoads, Cardiff By The Sea, CA (US)

(73) Assignee: Overtone, Inc., Carlsbad, CA (US)

( * ) Notice: Subject to any disclaimer, the term of this patent is extended or adjusted under 35 U.S.C. 154(b) by 694 days.

(21) Appl. No.: 11/286,572

(22) Filed: Nov. 23, 2005

(65) Prior Publication Data
US 2006/0161423 A1 Jul. 20, 2006

Related U.S. Application Data

(60) Provisional application No. 60/630,858, filed on Nov. 24, 2004.

(51) Int. Cl.
*G06N 5/00* (2006.01)
(52) U.S. Cl. .......................... 706/46; 706/45
(58) Field of Classification Search ............. 706/45, 706/46; 707/101
See application file for complete search history.

(56) References Cited

U.S. PATENT DOCUMENTS

| | | | |
|---|---|---|---|
| 5,412,756 A * | 5/1995 | Bauman et al. ............... 706/45 |
| 5,493,677 A * | 2/1996 | Balogh et al. ............ 707/104.1 |
| 5,659,766 A | 8/1997 | Saund et al. |
| 5,737,734 A | 4/1998 | Schultz |
| 5,873,076 A | 2/1999 | Barr et al. |
| 6,295,543 B1 | 9/2001 | Block et al. |
| 7,363,308 B2 * | 4/2008 | Dillon et al. ............... 707/101 |
| 7,370,023 B1 * | 5/2008 | Forsythe et al. ............... 706/46 |
| 2002/0022956 A1 | 2/2002 | Ukrainczyk et al. |
| 2003/0154072 A1 | 8/2003 | Young et al. |
| 2004/0093200 A1 | 5/2004 | Scott |
| 2005/0154691 A1 * | 7/2005 | Higgins et al. ............... 706/46 |
| 2007/0223699 A1 | 9/2007 | Jones et al. |

OTHER PUBLICATIONS

Island Data, "Knowledge Management 2002". http://web.archive.org/web/20021020042720/www.islanddata.com/modules_kbm.shtml. Captured by http://www.archive.org on Oct. 20, 2002. Captured by Examiner from WayBackMachine on Sep. 19, 2008.*

Island Data, "Insight 2003". http://web.archive.org/web/20030810001459/www.islanddata.com/irt_solutions_core.shtml. Captured by http://www.archive.org on Aug. 10, 2003. Captured by Examiner from WayBackMachine on Sep. 19, 2008.*

Island Data, "Express Response 2002". http://web.archive.org/web/20020417085401/islanddata.com/products_expressresponse_details.asp. Captured by http://www.archive.org on Apr. 17, 2002. Captured by Examiner from WayBackMachine on Sep. 19, 2008.*

(Continued)

*Primary Examiner*—Wilbert L Starks, Jr.
(74) *Attorney, Agent, or Firm*—Procopio, Cory, Hargreaves & Savitch LLP

(57) ABSTRACT

Systems, methods and software products analyze messages of a message stream based upon human generated concept recognizers. A sample set of messages, representative of messages from the message stream, are analyzed to determine interesting or useful categories. Text categorization engines are then trained, using the sample set and text classifiers are published. These text classifiers are then used to categorizing further text messages from the message stream.

23 Claims, 10 Drawing Sheets

OTHER PUBLICATIONS

McCarthy, et al., UMASS/Hughes: Description of the Circus System Used for MUC-5, Proceedings of the Fifth Message Understanding Conference, 1993, pp. 1-16.*

Kim, et al., Acquisition of Linguistic Patterns for Knowledge-Based Information Extraction, IEEE Transactions on Knowledge and Data Engineering, vol. 7, No. 5, Oct 1995, pp. 713-724.*

* cited by examiner

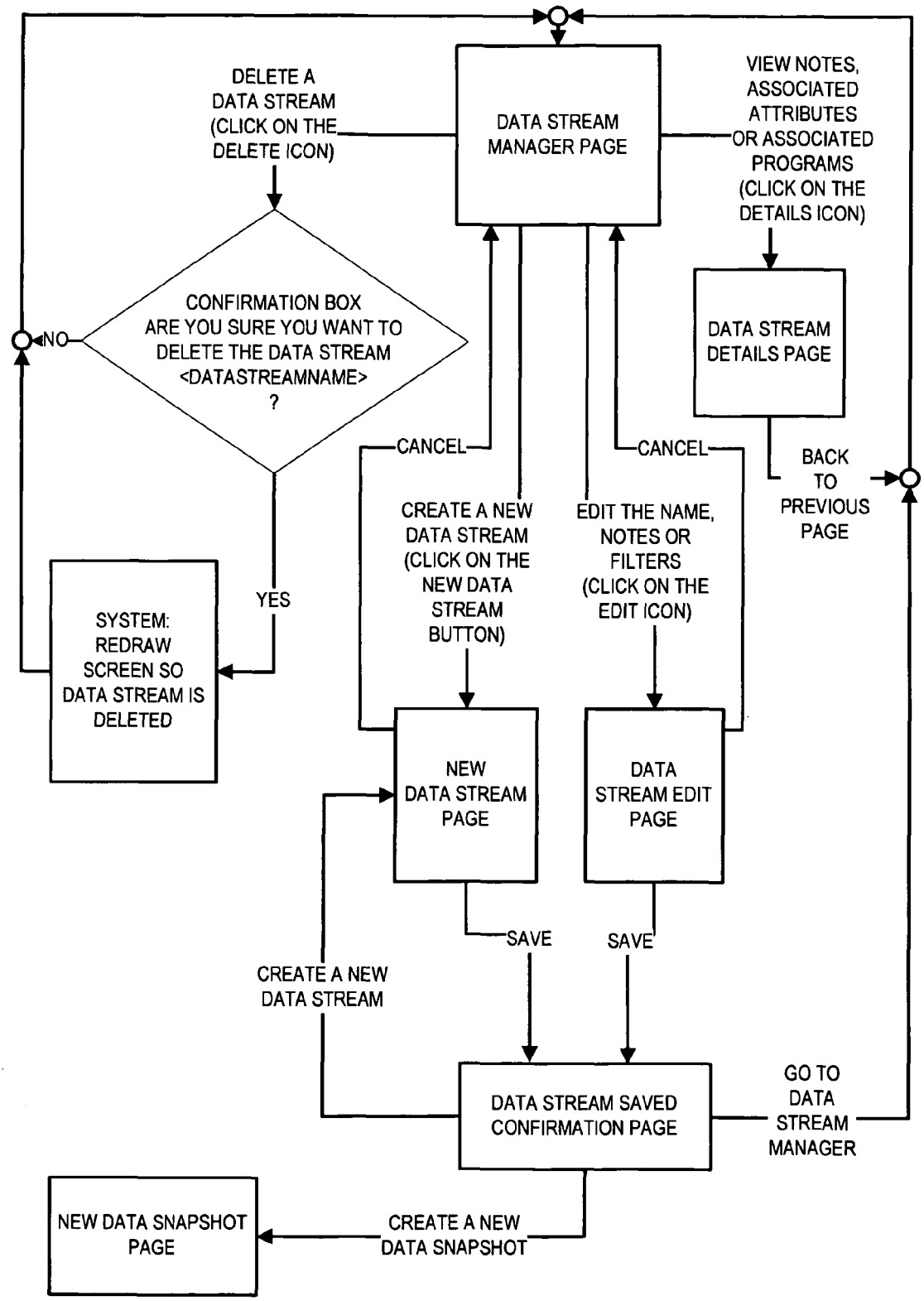
FIG. 7-A

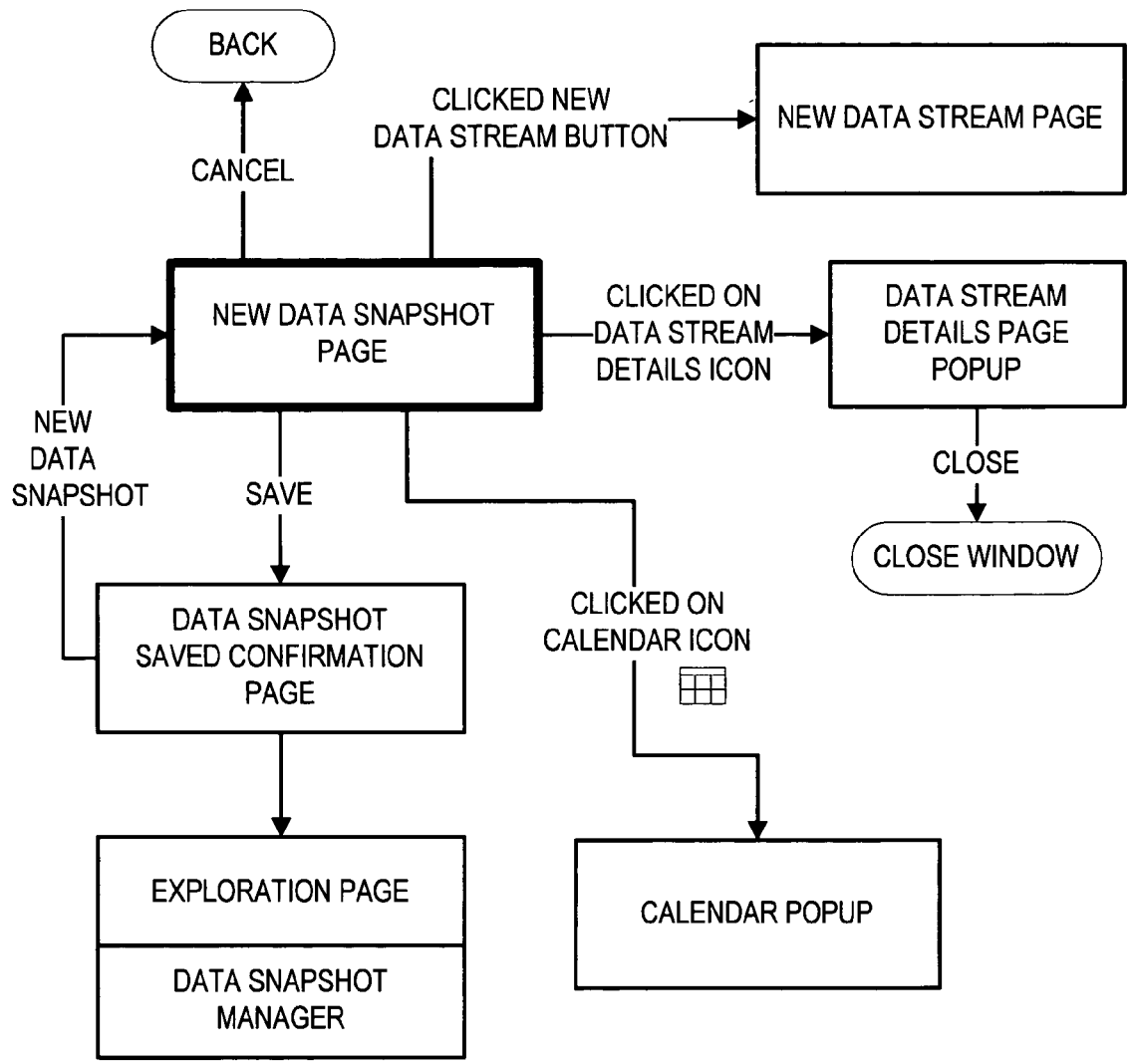
FIG. 7-B

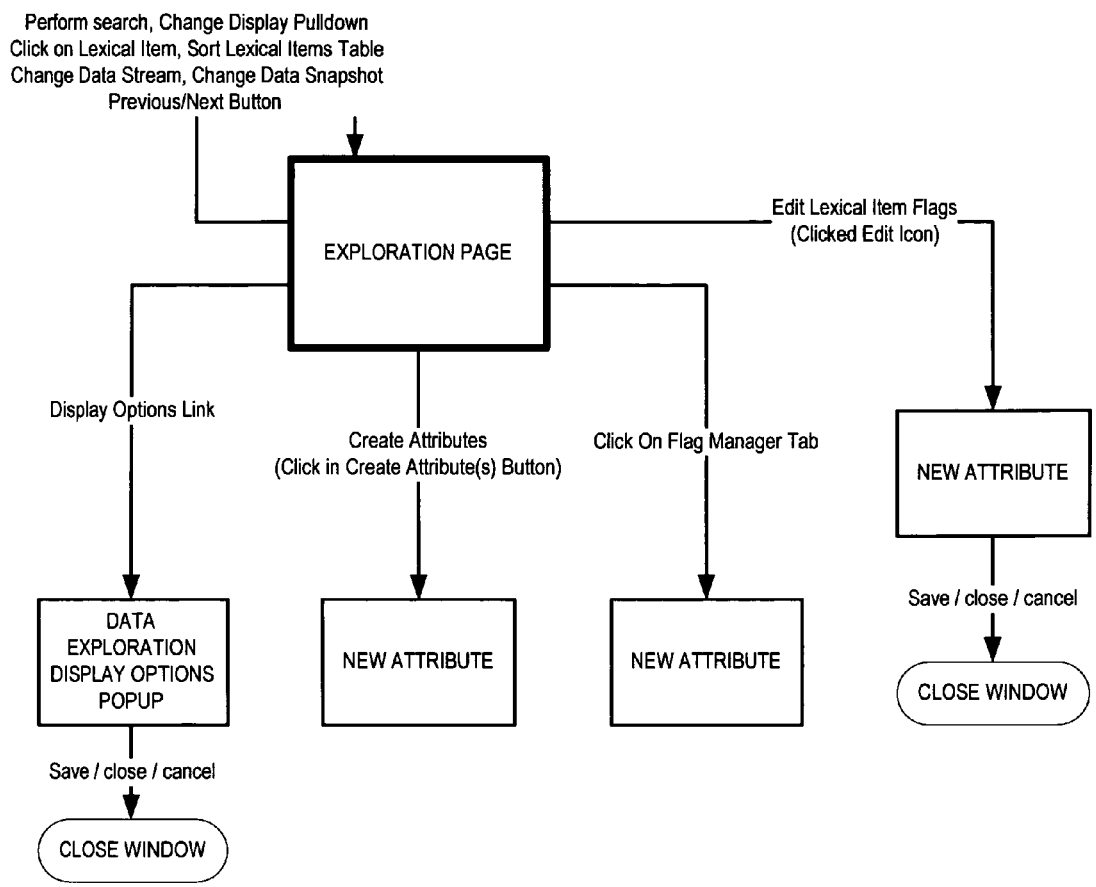
*FIG. 7-C*

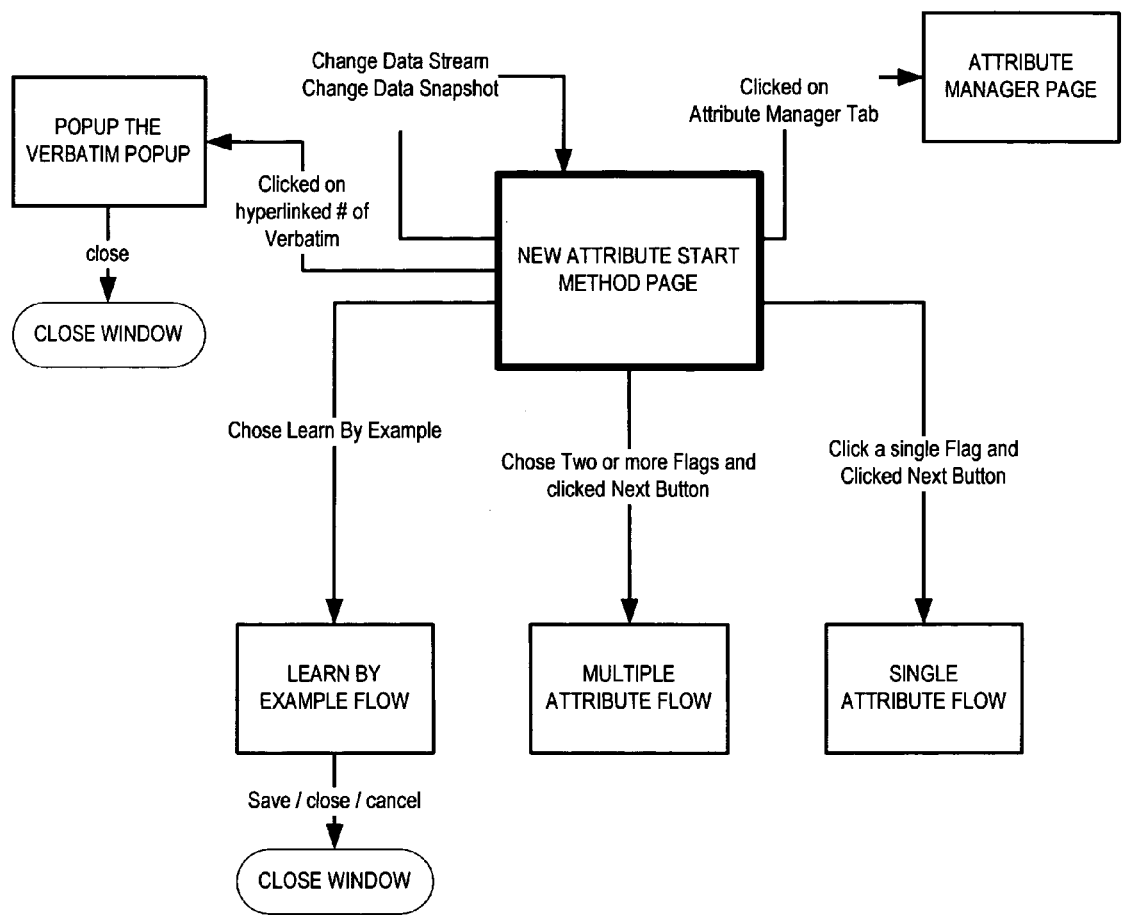
FIG. 7-D

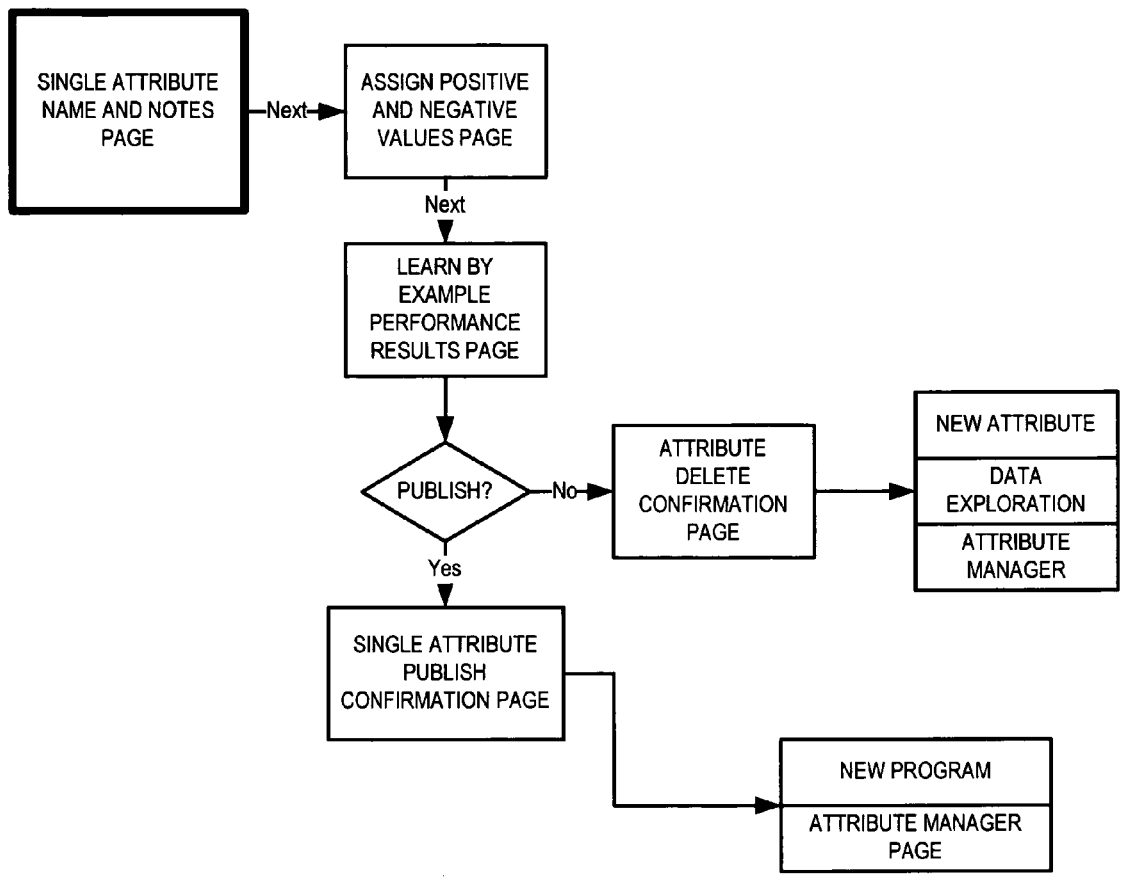
FIG. 7-E

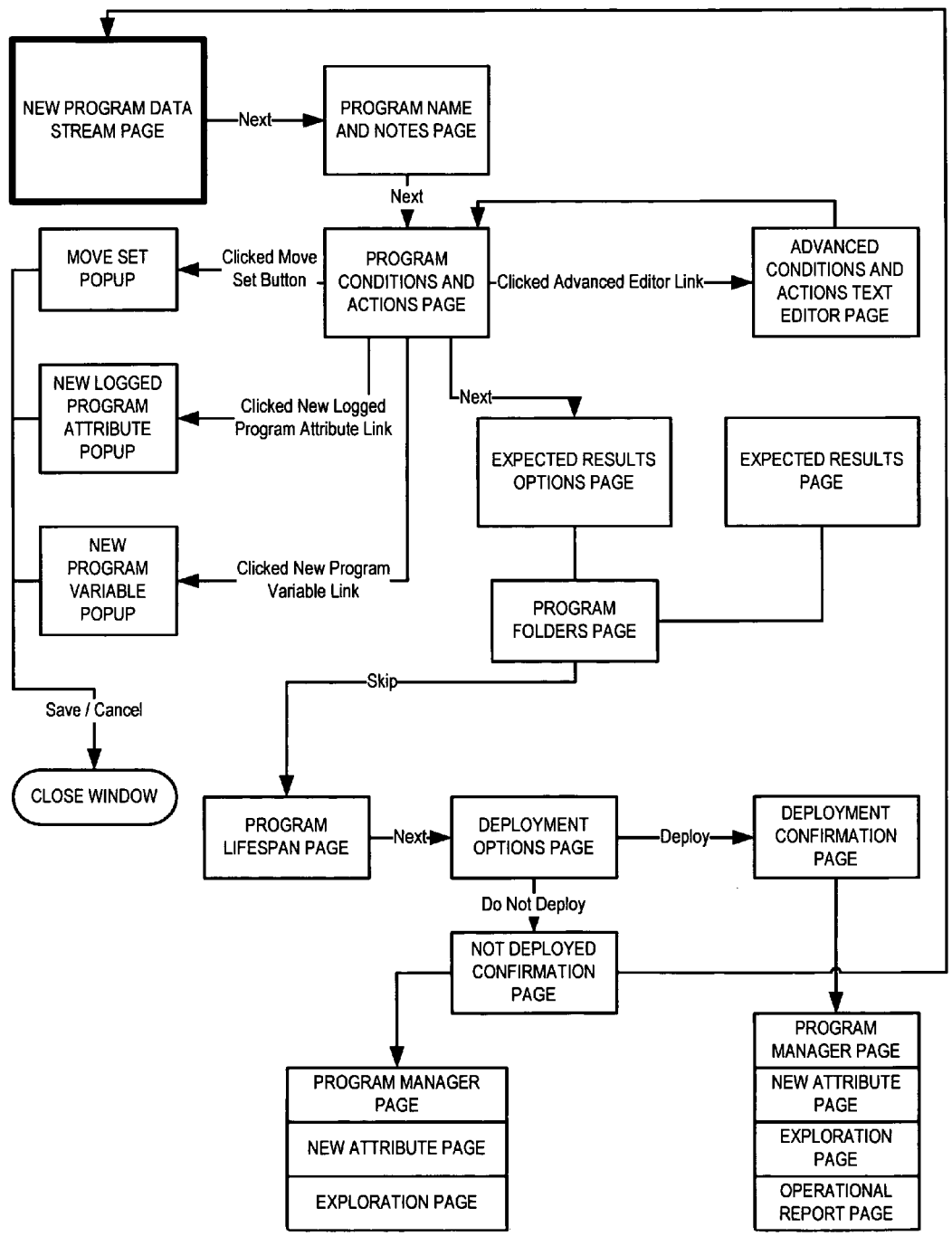
FIG. 7-F

SYSTEMS AND METHODS FOR AUTOMATICALLY CATEGORIZING UNSTRUCTURED TEXT

RELATED APPLICATIONS

This application claims priority to U.S. Provisional Ser. No. 60/630,858, filed Nov. 24, 2004, incorporated herein by reference.

TECHNICAL FIELD

This invention is related in general to information management systems and methods, and more particularly to a workflow system that uses a human-trained text categorization engine to analyze, process, and categorize data that contain natural language text.

BACKGROUND

The availability of on-line communication that includes but is not limited to e-mail, web-based feedback, and on-line chat has generated an explosive growth in data communication that does not come in the form of structured data, but rather as natural language text in digital form. Consumers and businesses are now able to communicate, execute transactions, and perform a variety of electronic business functions online.

The sheer quantity and lack of structure pertaining to natural language communications renders the complexity and cost of extracting value from this information prohibitive in many cases. Therefore, analyzing unstructured textual data and generating insight from such content has posed challenges for researchers analyzing customer communication, interests, and market trends. By the same token, many messages go unread simply because targeting large numbers of messages to appropriate parties within an organization is too costly to be done by current methods.

SUMMARY OF THE INVENTION

From the foregoing, it may be appreciated that a need has arisen for a workflow system and method to analyze and categorize unstructured text captured in digital form. It is also important that such a system utilizes human judgments to create (1) an adaptive method of identifying "concepts" based upon a cumulative sample of natural language text, and (2) methods to train automated recognizers in order to identify similar concepts in future messages with some degree of accuracy.

When natural language messages are received from customers in a customer relations management system, such messages are referred to as verbatim, and we will use the terms 'verbatim,' 'messages,' and 'documents' interchangeably here.

According to embodiments of the present invention, a system and method of analyzing text messages based upon human generated concept recognizers are disclosed. Verbatim are captured in a data source (FIG. 1 step 14, FIG. 2, FIG. 7-*a*). A sample set is created, that is a representative set of random verbatim from which interesting or useful concepts are discovered, selected, and for which automatic classifiers are trained (FIG. 1 step 18, FIG. 3, FIG. 7-*b*). This sample set is termed a data set, or an exploration set.

According to another embodiment of the present invention, a human uses the method of this invention to explore the data set. The exploration of the data set (FIG. 4, FIG. 7-*c*) encompasses: reviewing the contents of each document, either in arbitrary order, or by selecting a lexical item found in the exploration set (FIG. 4 item 410) and reviewing only messages containing that lexical item. Upon encountering an interesting verbatim, the user flags interesting concepts associable with the list of verbatim presented (FIG. 4 item 420). At the end of the process of exploration, any concept so flagged may serve as a seed for a text classifier to be trained in the next step of the process.

According to another embodiment of the present invention, training of concept recognizers for automatic discovery of matching verbatim in real-time processing is disclosed (FIG. 5). The workflow system provides the methods to convert concepts flagged during exploration into trained text classifiers dedicated to recognizing messages containing these concepts, using a performance gauge to progressively track the performance of the classifier throughout the training process (FIG. 5 item 510).

A technical advantage of one embodiment of the system and method of the present invention is that the workflow system and method allows for publication of the trained concept recognizer (FIG. 6) so that actions based upon an active set of programmatic rules can be used on the judgments of the text classifier to invoke another software program or process to be executed. These actions are termed Programs in the current invention.

Another technical advantage of one embodiment is that an efficient and simple user interface provides for the entire management of seeding classifiers, analyzing unstructured text, publishing classifiers based upon the expected performance goals for the concept, and processing the published classifier to trigger the execution of another software program or process within a single session of the invention.

Other technical advantages are readily apparent to one skilled in the art from the following figures, descriptions, and claims.

BRIEF DESCRIPTION OF THE FIGURES

For a more complete understanding of the present invention and advantage thereof, reference is now made to the following descriptions taken in conjunction with the accompanying drawings, wherein like reference numerals represent like parts, and in which:

FIG. 4 is an illustration of one embodiment of a system that provides the exploration of verbatim and the flagging of interesting concepts and generation of their classifiers;

FIG. 5 is an illustration of one embodiment of a system that monitors the performance of the concept classifier during the training of the concept;

FIGS. 7-A to 7-F are flowcharts that elaborate on an embodiment of selected portions of the method of claim 1.

DETAILED DESCRIPTION OF THE FIGURES

Figure 1:
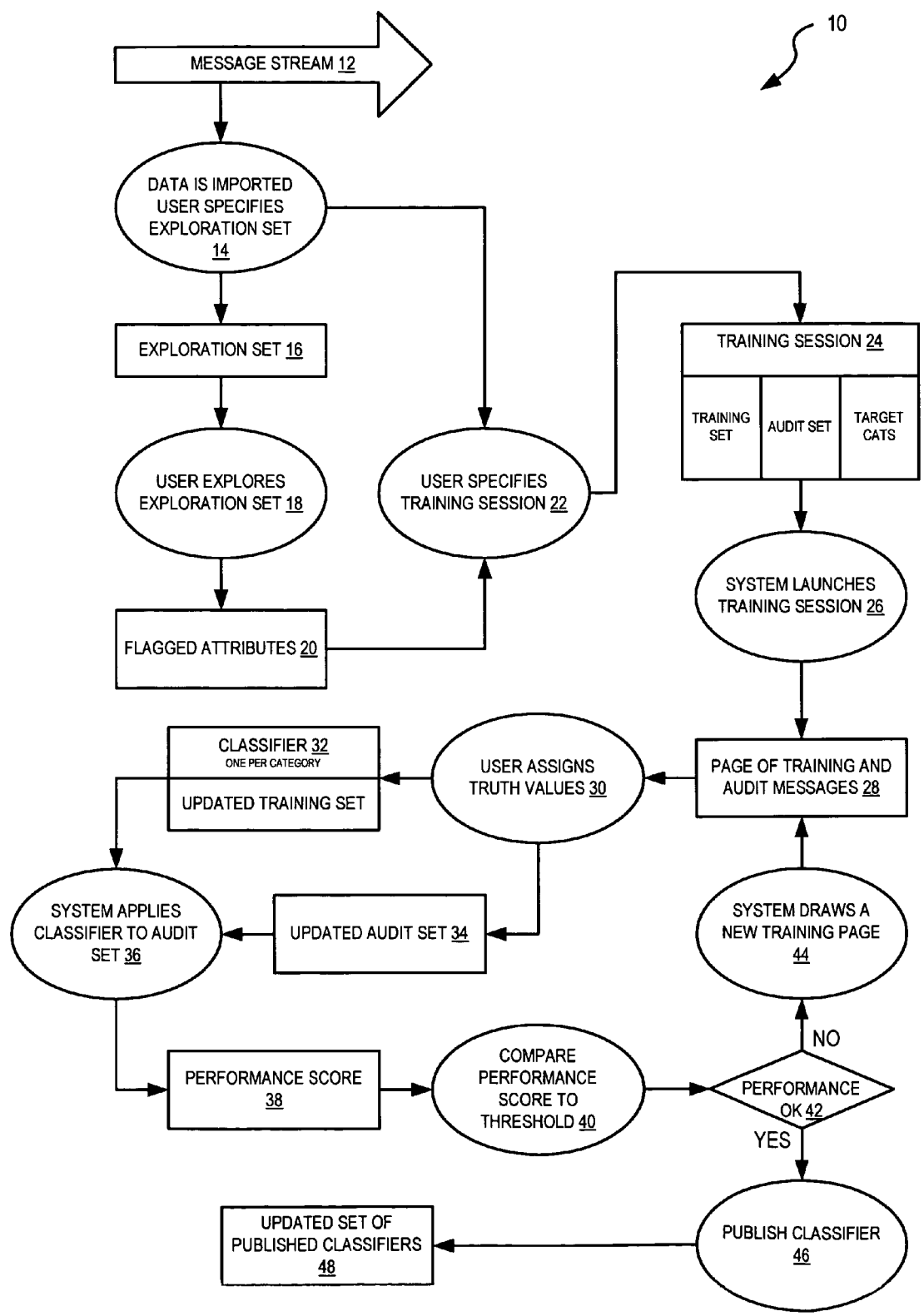
FIG. 1 is a flow chart showing one exemplary process for exploring message data, training one or more text categorization engines, publishing text classifiers and classifying unstructured data for further processing.

In the following discussion, experience in computer programming, database design and management, computer interface design and implementation and use of software development tools is assumed. The following references may also provide background information to this application: Mitchell, T., Machine Learning. Boston: McGraw-Hill, 1997, Manning, C. and Shutze, H., Foundations of Statistical Natural Language Processing, Cambridge, Mass.: MIT Press 1999, and Sheskin, D J. Handbook of parametric and nonparametric statistical procedures (second edition) Boca Raton: Chapman & Hall, 2000.

Natural language text, encoded in digital form, is herein termed unstructured data. This contrasts with structured data, in which data is represented in some canonical format, from which well-defined semantics can be inferred and automatically processed. On the other hand, semantics of unstructured data defies inference by a computer, making automated processing of the unstructured data problematic. One method of processing unstructured data is to use statistical means, where categorization judgments are encoded as structured attributes to facilitate determining semantics of the unstructured data.

Natural language text comes in many varieties, serves many purposes and arises from many sources. As such, different kinds of text may differ dramatically from one another. Conversely, natural language text that arises from a narrowly defined range of sources may tend to range over a similarly narrow range of topics (such a range of topics is called a domain herein). For example, email messages from customers of a business directed to the business may be one such domain, and news feeds issued by a news agency may be another such domain. The email messages directed to the business are probably relatively short messages relating primarily to issues surrounding the goods and services produced by the business. The news feeds are probably longer messages relating to world affairs. The statistical distribution of linguistic features germane to each of these domains is probably very different.

Unstructured data from a single domain may therefore be considered to contain messages with characteristics that are consistent to some degree; even in messages yet to be seen. Such messages are called the message stream herein.

One desire may be to automatically categorize messages from a message stream into one or more categories. For example, a message stream consisting of incoming emails may be categorized into sales opportunities. In another example, a subscriber to a news service may only be interested in stories that relate to the economy and therefore desires that the message stream be so categorized. In another example, an individual may wish to flag unsolicited advertisements ('spam') in his or her email message stream for special treatment.

A user receiving a message stream may therefore wish to train an automated system to automatically categorize messages from the message stream. The automated system may include one or more text categorization engines that use one or more text categorization algorithms. Examples of text categorization algorithms may be found in the field of machine learning, for example naïve Bayes, k-nearest-neighbor, etc.

Text categorization engines require training for a particular message stream, herein called the target message stream. A training corpus may be extracted from the target message stream and typically consists of a large number of messages (usually numbered in the hundreds or thousands) drawn randomly from the target message stream. The text categorization algorithm also requires that binary truth values be assigned to each message in the training corpus. Each message is considered positive if it is judged an instance of the target category, and negative if it is not. Each text categorization algorithm extracts a set of features from each message, and captures important aspects of these features' statistical distributions to render judgments reflecting future messages' likelihood of being positive with respect to the target category. The features extracted from the messages are, for example, words occurring in the document, but may also include other attributes of the text within the message such as word length, word stems, thesaurus entries associated with certain words, or any other value which may be automatically associated with the content of the messages.

One approach to assigning truth values to messages in a training corpus involves presenting instances from the corpus to a human user, who assigns truth values to the messages based on his or her own subjective understanding of the category. An interactive computer program dedicated to facilitating the training of text categorization engine is called a training system. In general, the more truth values assigned to messages in a training corpus, the more data points there are to inform the text categorization algorithm, and, therefore, the more accurate a text categorization engine based on that algorithm becomes. However, the user faces diminishing returns since the incremental improvement amount reduces with each successive new data point. This raises the question: how will the user know when sufficient truth values have been provided to adequately train the text classification engine? This concept is addressed below, and is one major advantage of systems and methods disclosed herein.

The preceding discussion assumes that a user already knows which text categories are of interest, or at least which text categories pertain to the target message stream. The proposed system may also provide tools to allow a user to explore messages of a message stream, and to tentatively identify interesting and useful categories within those messages, prior to training one or more text categorization engine.

Once a category of interest is identified, and a text categorization engine is trained such that its categorization performance meets a specified performance criterion, the text categorization engine is ready for use. In the system described below, a text classifier, which includes the categorization information trained into the text categorization engine, may be published so that it is automatically applied to new messages received from the message stream, and defines rules to automatically process messages based on the categories assigned to them.

FIG. 1 is a flow chart showing one exemplary process 10 for exploring, training, publishing, and classifying unstructured data. In this process, the user may explore data from a target message stream to identify interesting categories, train one or more text categorization engines to categorize received messages, publish one or more text classifiers, and use the text classifiers within text categorization engines to categorize messages from the target stream for further processing.

Specifying and Capturing Data from a Message Stream

In a data capture phase of process 10, represented by steps 14, 16, 18, 20 and 22 of FIG. 1, messages are captured from a target message stream 12 and imported into the system for analysis. Messages may initially be in the form of files stored on disk, records in a database, a live feed from incoming internet traffic or some other source. In one example, a user may have already collected and stored exemplary messages from a target data stream as a tabulated data file where each line in the file expresses a record associated with a message, and each field relates to one datum associated with the record. The first line of the file may, for example, be a 'header' naming each field.

Figure 2:
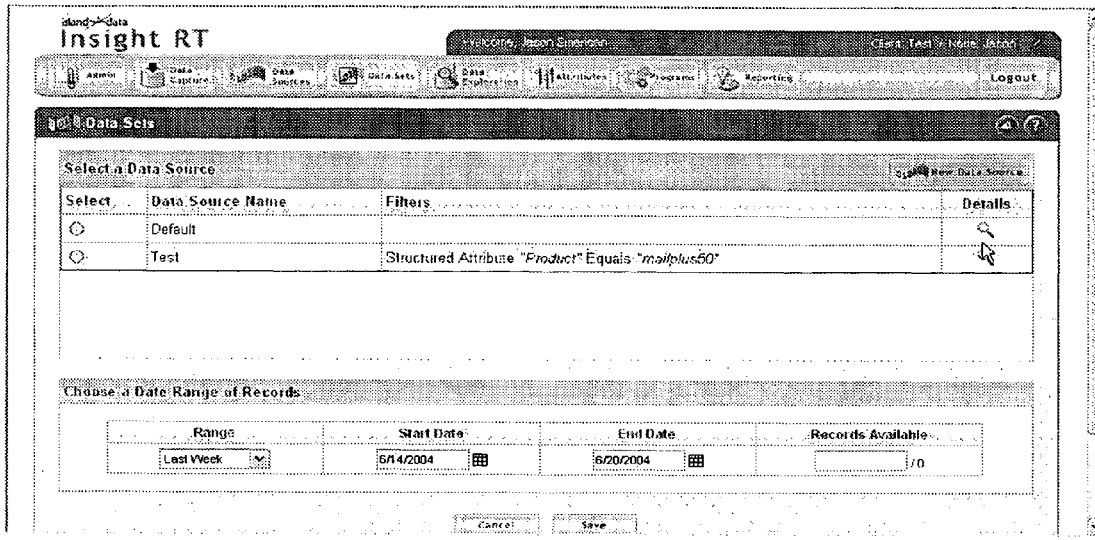
FIG. 2 is an illustration of one embodiment of a system that provides the capturing and loading of verbatim into a system data source.
Figure 3:
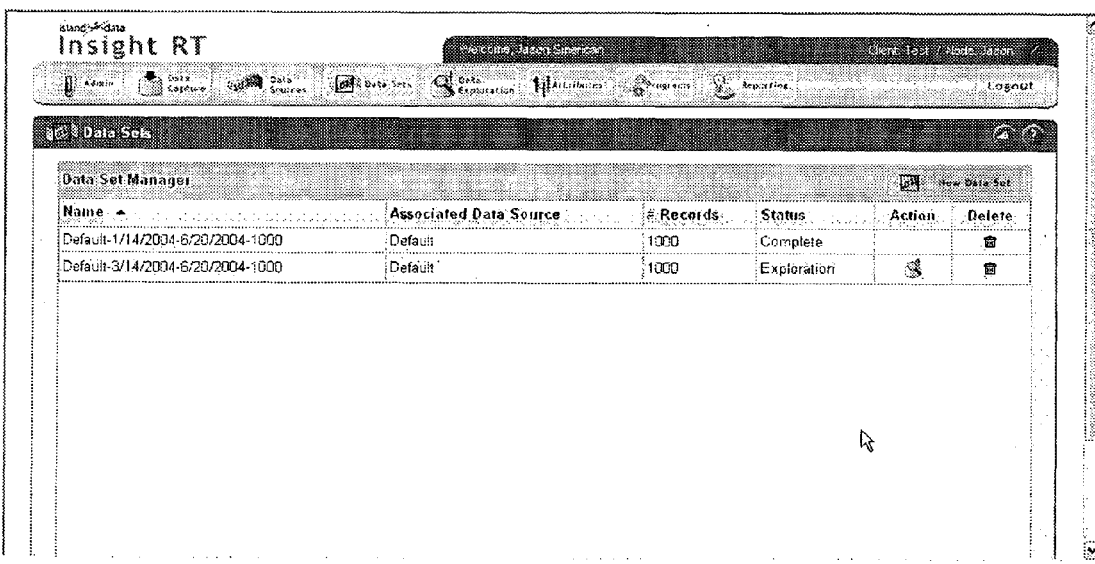
FIG. 3 is an illustration of one embodiment of a system that manages the data set.

In this example, the user may be prompted to indicate a location of one or more files rendered in this tabular format within a file system for import into the system. FIG. 2 shows one exemplary screen for selecting a data source for import. During such an import, the system may prompt the user to associate each file with a 'data source' label to identify the message stream from which the data is taken. The system may also provide tools that allow the user to specify details of the format of imported data, including record and column delimiters, and a mapping between one column in each record and the target message body. The user may also be prompted to specify a mapping between other columns and the names of any other structured attributes to be associated with each message during import. Preferably, each message has at least one structured attribute assigned to it, such as a date or timestamp indicating or reflecting the time of origin. In step 14 of process 10, the data stored in such tabular form is imported. For example, step 14 may read in and parse one or more files whose fields are delimited by some character, specified by the user when prompted. The important fields may be captured and stored in a database to be used by the system, with the user selecting fields for the text of each document, a data stream identifier, a timestamp, and imported text attributes, as applicable. The system may utilize a standard graphical user interface to prompt the user as necessary.

The fact that each body of imported data may be assigned a 'data source' label allows one organization to deal with one or more uniquely named message streams, each with its own statistical distributions. There may be a 'default' data stream predefined, which simply assumes all the user's data ranges over the same domain.

A text categorization engine trained with data from a given message stream is preferably applied to future messages from the same, or an equivalent, message stream. The reason for this is that the basis for statistically driven text categorization engines assumes that messages within a given message stream have similar distributions of features, and performance may degrade to the extent that this assumption is violated.

In a preferred implementation, new message streams may be created by specifying a filter which may take data from an already specified source, and apply a condition/action rule which only makes some subset of the input available to the new message stream (see below for a discussion of condition/action rules). Such a filter would have the advantage of providing a richer vein of data for relatively rare text categories.

Thus, at the end of the data capture phase of the workflow, a body of text messages and associated attributes will exist in a database for use in the remaining phases of the process.

In one embodiment, an explicit data stream label is eschewed. This simplifies the user interface and the implementation in the code base, but may lead to sub-optimal categorization performance if statistical distributions between the text that is used for training, and the text to be processed by the resulting text categorization engine, differ radically.

In another embodiment, the requirement that structured attributes be associated with the text to be imported may be removed. In this case, the system may allow for the import of one or more 'flat files' of text, or text in some other format.

In another embodiment, the data to be imported is taken from a live feed of data from a source such as a stream of incoming email messages.

In another embodiment, the tabular data is imported from some external database, rather than spreadsheet files, and field mappings are done through database queries rather than reading a header file. In such cases, the user would not have to provide information about file delimiters.

In another embodiment, the above mentioned filter is not used to define new data streams.

The Exploration Process

In order for a human analyst to subjectively understand the contents of the data under examination, it is often useful to allow him/her to review the contents of a number of messages, and simply make notes, group similar messages together, and flag interest messages in a free-form environment. The system discussed below provides tools to facilitate just such an exploration.

The exploration process begins when the user specifies a message stream by indicating the 'data source' label, then extracting an exploration set 16 from the message stream associated with that label during the data capture phase (see FIG. 1, steps 14 and 16). In the preferred embodiment, each message has a timestamp, and the user specifies a date range and a numeric upper limit on the size of the exploration set. A sample of messages corresponding to this specification is then drawn randomly from the available messages of the target message stream imported into the system. Data source labels and timestamp fields are, for example, associated with message texts in the database during the data import process described above.

During an exploration process (FIG. 1 step 18), messages from exploration set 16 are displayed in a standard graphical user interface, where at any one time a page of messages of the exploration set are presented to the user. The user reviews the contents of each presented message and determines whether a given message belongs to a text category worth training. The user may either assign a new 'flag' or assign one of a set of flags already declared to the message. In the exploration interface, each document bears the mark of as many flags as have been assigned to it during exploration. The name of each flag can be easily edited, and in a preferred embodiment a set of notes is kept for each flag, so that the representation of each flag can evolve as the user continues the exploration process. The implementation of a flag can use a standard 'container' software pattern, with persistent properties for fields for a label and notes, the contents of such a container being each message record associated with the flag during exploration.

In a preferred embodiment, at any time the user may indicate a specific word or phrase, and a message listing may render messages containing that word or phrase. This may allow the user to identify a number of messages which have important lexical content in common. This can be implemented in a code base if each message is tokenized into a sequence of word tokens, and 'indexed' so that mappings between each token's associated word form, and documents containing tokens of that word are stored in the database.

Figures 4, 5:
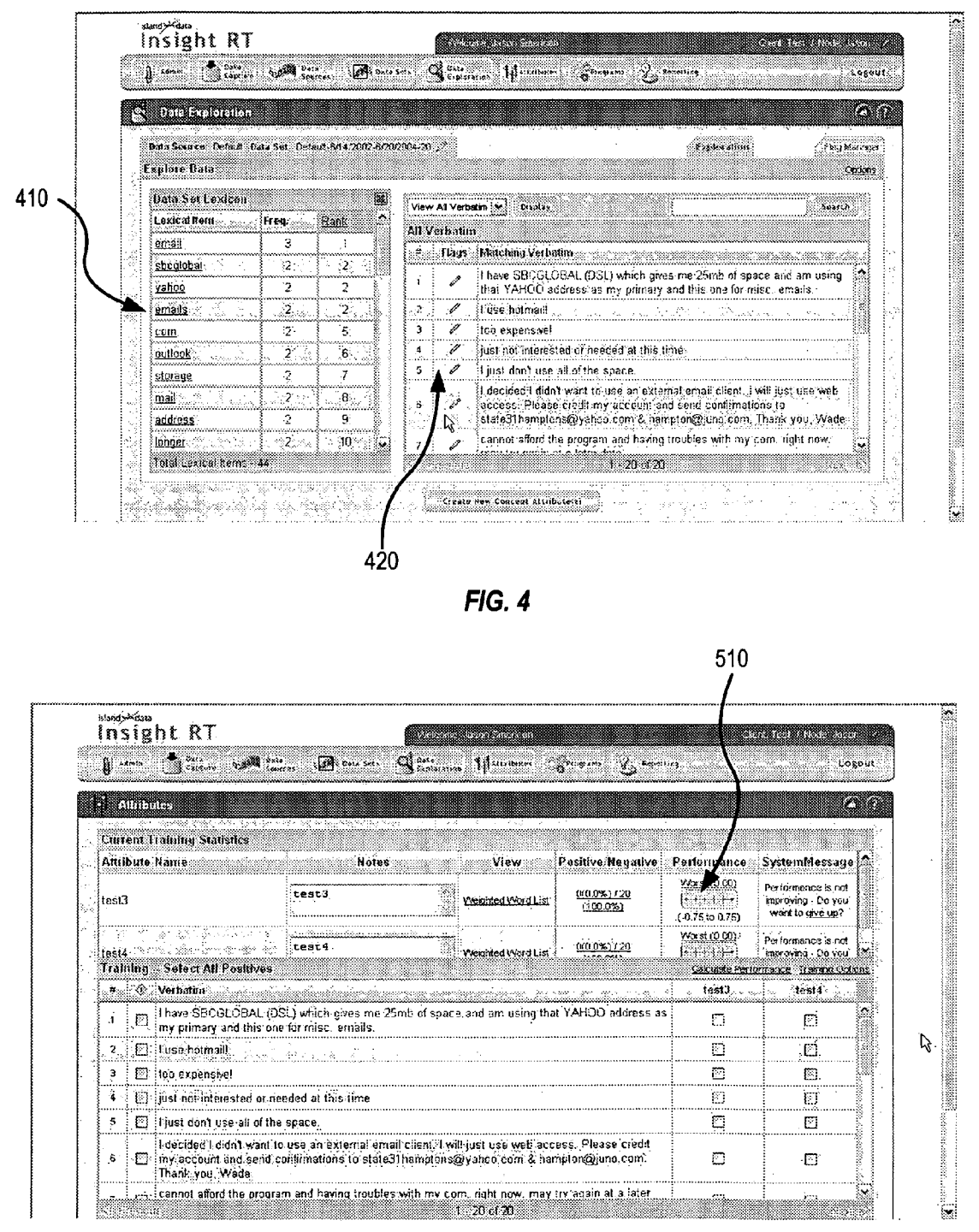

In a preferred embodiment, the user may specify such words and phrases by consulting a listing of words found in the exploration set and indexed (see FIG. 4 item 410). Let us call this a lexical listing. The user may specify whether such a listing can be ordered alphabetically, or sorted by 'significance', which reflects the frequency of each word in the exploration set, compared to what would be expected given its observed frequency in a background corpus of the target natural language, whose lexical frequencies are derived from a broad a range of messages from many domains. This feature can be implemented by collecting a number of texts in the same language as the data set under examination (but ranging over a wider set of domains), then counting the number of occurrences of each token in the background corpus, along with the sum of all tokens in the background corpus. It should be straightforward to one skilled in the art of corpus linguistics to calculate an estimate of the expected frequency of occurrences for each word form per unit of text, and derive a significance score based on the observed frequency of each word form in the data set under examination as compared to this expected frequency.

Again in the preferred embodiment, at any time during the exploration process, the user may indicate a specific flag and review messages to which the flag has been assigned. Let us call this a by-flag listing. This can be implemented by a simple retrieval of the contents associated with the flag in question, and displayed using practices common to graphical user interfaces. After reviewing the set of messages so flagged, the user may gain insight into whether the category has been properly named, or realize that the flag represents a very broad category, and that other flags with narrower scope might be better assigned.

The exploration process is advantageous because in practice, a user may not be completely familiar with the data s/he is dealing with, or s/he may have misconceptions about them. This allows the user to get a good subjective understanding of the contents of the message stream under review, and be able to identify which categories are interesting, and which may be good subjects on which to train a text classifier.

An important output of the exploration process is a persistent set of named 'flags' (see FIG. 1, step 20), with which are associated several positive instances, and notes the user has taken. The user may then promote any one or more of these flags into a training session 24, which produces a classifier for the category associated with the flag in the next phase of the workflow, as described below.

One embodiment eschews the use of the background corpus to render 'relevance' information in the lexical listing. Another embodiment excludes the use of a lexical listing altogether. Another embodiment does not include a flag listing. Yet another embodiment forgoes use of an exploration phase altogether; the user simply specifies the names of categories to train, proceeding directly to training phase 24.

The Training and Audit Process

Having identified the important categories of text one is likely to encounter in one's data, it is greatly advantageous to be able to automatically recognize messages that are likely to be members of those categories. To do this, training data is provided whose statistical distributions can inform automatic text categorization algorithms.

In a preferred embodiment, this process begins with the creation of a training session, with two subsets of the exploration set: a training set and an audit set. Training and audit sets are also disjoint, so that no document in one set belongs to the other. The audit set may be large enough to guarantee a suitably small sampling error, determinable through standard statistical means. The training session may also be dedicated to one or more target categories. (see FIG. 1 step 24). In the preferred embodiment, more than one category may be trained during any training session. This may be implemented by maintaining separate persistent containers for training and audit sets, whose members are drawn from the exploration set described above, which should be straightforward to an experienced programmer with database programming skills.

After the user specifies the categories to be targeted in training (FIG. 1 step 22), the system automatically creates a training session 24 with training and audit sets, and composes the first page of training data (see FIG. 1 step 26). In a preferred implementation, for each page of the training session (FIG. 1 step 28), messages are displayed in one column, with 'check box' columns corresponding to each category being trained during the session (see FIG. 4).

During training session 24, messages from the training and audit sets are presented one page at a time to the user. The user reviews each message in turn, and indicates truth values as to whether the document is positive for each category being trained during the session (FIG. 1 step 30). The system may maintain and store a mapping between each message and its truth value with respect to each category associated with the training session.

In a preferred implementation, training and audit messages are displayed interleaved on each page so that half of the messages under review are from the audit set until the audit set has been exhausted. This insures that early on in the training process the margin of error may be relatively small, and performance feedback may be stable.

In a preferred implementation, messages which have been flagged for the target category during exploration are presented as 'checked', and unchecked otherwise, until the user explicitly checks/unchecks them.

The user may be unaware as to which messages were drawn from the audit set and which from the training set, to avoid introducing a bias.

When the user has assigned truth values for each message on a page for each category being trained, s/he presses a 'next page' button, and the following things happen for each target category:

Messages in the page just visited drawn from the training pool are added to the training instances that inform a text categorization engine, which recalculates its model of its associated category (FIG. 1 step 32).

Messages in the page just visited from the audit pool are added to the audit set for the target category (FIG. 1 step 34), and the messages in the newest version of the audit set are classified with the newly updated classification engine (FIG. 1 step 36).

Judgments of the categorization engine are compared to truth values assigned by the user to messages in the audit set, and a performance score 38 is derived (FIG. 1 step 38). Methods of calculating scores of performance in text categorization such as Precision, Recall, F1 and Correlation Coefficient may be utilized.

Performance score 38 is compared to a threshold specified prior to the training session by the user (FIG. 1 step 40). To implement this, the interface may provide a means for the user to specify this threshold, and to store this threshold per-category in the database.

If performance meets or exceeds the performance threshold, the user is prompted with the option to discontinue training (FIG. 1 step 42), and publish the classifier (FIG. 1 step 46). Publication is discussed below.

If performance has not yet met its target, or the user opts to continue training, a new page of training and audit data is composed and presented to the user, and the training process continues (FIG. 1 step 44).

Thus, with each new page, the performance score is presented for each target category in the training session indicating how well the text classifier is performing against the audit set.

In a preferred embodiment, performance score 38 is a correlation coefficient. This has certain advantages, such as having a well understood and easily calculated margin of error, so that a lower bound of the confidence interval can be taken as a critical benchmark of performance. Correlation coefficient is a standard measure of correlation known to the art of statistics.

Thus, a lower bound on performance against the audit set can be compared to some predetermined threshold to determine when enough training has been performed for any given target category. At such point, the user may feel confident that s/he can stop training and publish a classifier which is likely to meet its specified performance goals.

Many classification algorithms produce a numeric interim score for each document reflecting a probabilistic judgment as to the degree of match, then make binary (positive/negative) classification judgments comparing the interim score to some threshold. In such cases, it is possible to select an optimal threshold by searching a set of possible thresholds, and selecting the threshold that maximizes the performance score. Such a calculation uses values calculated by the text categorization algorithm.

Thus, at the end of the training phase, the system may represent, for each of its target categories, the parameters pertinent to at least one text classification algorithm, informed by the training data provided, so that the classification algorithm renders a classification score for any text presented to it as input. In a typical case, this would involve identifying a set of significant features attainable from any text, where each such feature is assigned a weight or coefficient, such that a calculation can be performed to return a value reflecting the likelihood that the text in question is an instance of the target category. In the typical case there may also be global parameters such as a prior probability for the category, and an optimal threshold that applies to the target category generally rather than being associated with any particular feature. These parameters may exist in a database representation of the classifier so that they can be retrieved and applied to future texts.

In an alternative embodiment, performance score 38 is displayed on a screen (see FIG. 4 item 410), and the user is not prompted with the option to publish, but rather chooses for himself when to publish in consultation with the performance score display.

Figure 6:
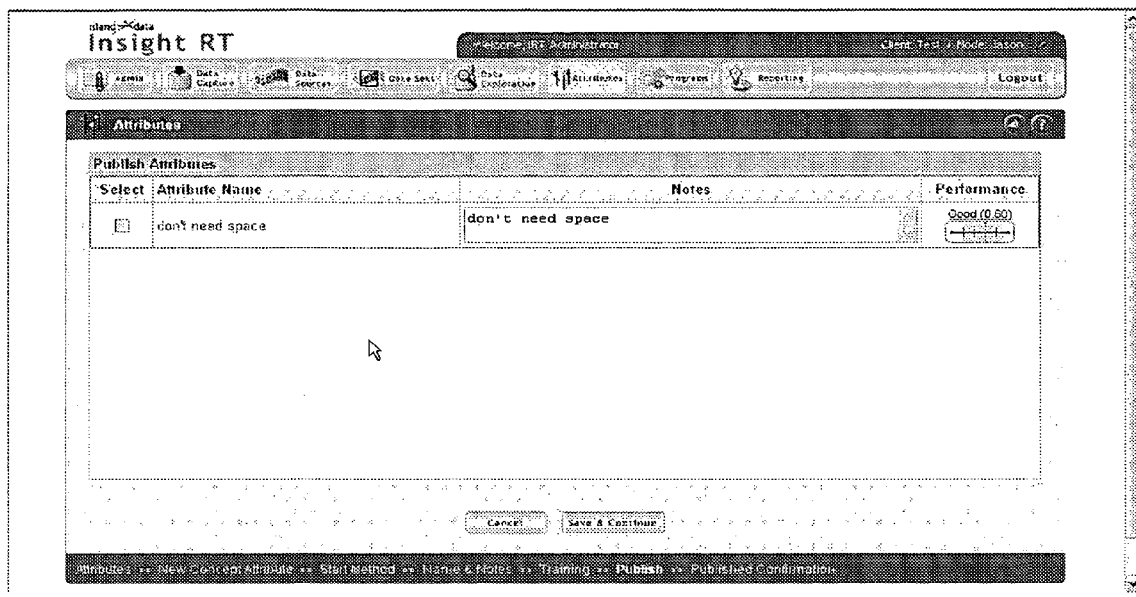
FIG. 6 is an illustration of one embodiment of a system that provides the method of publishing the trained concepts.

In an alternate embodiment, in circumstances where instances of the category can be identified with one or more structured attributes (such as a Boolean attribute suggesting that the author bought a product), the training process can be fully automated, with truth values assigned automatically by referring to the structured attributes in question. We refer to this as a 'Learn by Example' feature (see FIG. 6). In this embodiment, the user creates data for import as described above, but after indicating a field whose values are a basis for truth values, training and audit is done without having to page through each training instance.

In another alternate implementation, performance score 38 optimizes for a weighted score combining 1) the risk associated with missing a false negative, and 2) the cost associated with processing a false positive, and this process provides a means for specifying these risks and costs as they pertain to the user's particular application.

Publishing a Classifier

Having provided training data to train a text categorization engine, and evaluated the categorization performance of that engine with respect to the target category, it is useful to save important parameters of the categorization engine so that they can be retrieved and applied to categorize future texts.

In a preferred embodiment, when the minimum performance criterion has been met, process 10 gives the user the option of publishing the classifier (FIG. 1 step 46), after which point the set of published classifiers (FIG. 1 step 48) actively assigns categorization scores to new messages drawn from the target message stream as they are imported into the system. This means that each message from the message stream processed by the system may be associated with a structured attribute named after the category, and be assigned the score returned by the classification engine reflecting the likelihood that the message is a positive instance of the category. To implement this in the code base, it may capture text messages from the same (or equivalent) source as the original training messages. Then it applies the classification algorithm trained during the training phase, using the parameters specific to each target category for that algorithm stored during the training phase. This should be straightforward for a programmer with skills in text categorization and with database skills.

In the preferred implementation, more than one classifier may be available, based on competing algorithms or configuration parameters. These may each be trained with the target classifier's training set, and tested against its audit set, in turn. A classifier whose performance score 38 on the audit set is highest is then selected as the preferred classifier for that category.

Thus, at the end of the training phase of the process, the system may represent and persist whatever data are needed to inform an optimal classification engine, so that it can classify any arbitrary text for any of the target categories trained.

An alternative embodiment might only use a single classification algorithm rather than using the competing algorithms described above.

Programming the System to Respond to Message Categorizations and Attributes

Having attained an ability to automatically categorize texts with a text classification engine, the ability to further automate a process dealing with texts falling into one or more of those categories (for example, automatically routing emails to some member within the user's organization) may be useful. To accomplish this, the next phase in the workflow described here allows the user to specify which actions the system may take, and under what circumstances to take them.

A preferred embodiment of the invention also has a feature that allows the user to write executable rules to automatically assess one or more attributes assigned to a message taken from a given message stream, and take action accordingly. As a general process, this is done as follows:

The user identifies a target message stream (or relies on a default);
The user defines a set of conditions that may hold per message in order to trigger some action or actions;
The user defines a set of actions that may be taken when the set of conditions is met.

In the preferred embodiment, this step is also included:
The user names the rule, and optionally adds notes.

Specifying Conditions

In order to implement a condition/action rule-based system, it is necessary to specify the 'condition' part of the rule, which may evaluate to 'true' when the conditions specified are met, and automatically triggers the 'action' part of the rule as the rule is systematically applied to each message fed into the system.

In general, we assume a model where each message has some set of attributes which may be associated with it. Such attributes may be structured attributes, which were assigned to the document from some process external to the invention, and imported into the system coincidentally during import of the document. Examples of structured attributes might be an author's name, social security number or zip code, or any other datum which the user was able to associate with the message during whatever process captured the message prior to its import into the system. This may be done by representing the data in tabular form prior to use by the system, as discussed above.

Other attributes may simply be inherent to the data, such as whether its text matches a given regular expression.

Of course one important type of attribute is the kind of attribute that was trained by the classifier training algorithm described above, and assigned to each message on import. It should be clear to one skilled in the art text categorization how to associate such attributes to arbitrary texts.

The rules described here are grouped into suites called programs, and another type of attribute is one which was itself established as a temporary variable, established by the action of some rule that executed for the target message prior to the assessment of conditions for the rule at hand (see below).

Simple conditions within a rule can then be built by specifying standard Boolean comparative operators (><=, etc) to the values associated with each such attribute in the manner typical of rule-based systems.

The interface provided by the system allows the user to use the standard Boolean operators (and or, etc) to recursively build up complex conditions from combinations of simple conditions. The process of building complex Boolean expressions out of simple ones is commonplace in computer programming, and it should be clear to one skilled in the art how to implement such functionality.

Specifying Actions

An action is some programmatic behavior that is systematically taken upon each message examined by a program, whenever that message evaluates as positive with respect to the program's condition component.

Possible actions to specify include, but are not limited to:

Assigning a structured attribute to the message at hand within some relational table.

Assigning a value to a temporary variable, which a condition of some other rule can reference when applied to the document at hand.

Calling some program external to this invention, with some set of input arguments.

Whenever a structured attribute is assigned to a message during the action of a rule, it becomes visible in the database managed by the system, allowing future users to use that attribute as a filter in defining future message streams, or as a basis for business reporting about the nature and contents of incoming messages.

The fact that temporary variables can be assigned in one rule and assessed in another rule facilitates a regime in which a number of relatively simple rules can combine in a suite. When implementing, the implementer guarantees that evaluation of such rules is scheduled so that variables are set first and referenced afterward, in a manner typical of any standard reasonably sophisticated rule-based system.

When an external program is invoked, the system may be built in such a way that it has a means of invoking the program, such as a shell call within the native operating system, or an IP address to which a server request can be directed. The system may also encode and implement knowledge as to the set of input arguments required by the external program. In our preferred implementation, the system may be configured to reference external programs running on HTTP servers with known URLs, and arguments are passed with standard HTTP posts. Both shell calls and client/server web service calls are well established technologies.

In an alternative embodiment, the definition of 'local variables' is eschewed, which may simplify the user interface, although it may reduce the expressive power of the system.

One might also make this a simpler system which did not import structured attributes, and whose conditions dealt exclusively with attributes assigned by the categorization engine.

One might limit the scope of the actions of rules so that they only pertained to changes in the data base, or conversely only triggered actions by external programs, instead of being able to specify both possible actions.

One could reduce the response to a simple system whereby texts are provided as input to the system, and the only output would be a categorization judgment. This could be done by embedding the categorization engine in another application, or making the system available as a shell call, or providing a simple web service. Implementing any of these alternatives should be straightforward to a skilled programmer.

CONCLUSIONS

From the foregoing discussion, it should be clear to one skilled in the art that this system can be built using one or more standard digital computers, with a standard software development environment, including a means of building and maintaining a database, internet connectivity, building a graphical user interface or HTML interface, using standard practices established for statistics, for machine learning algorithms dedicated to text categorization, and rule based programming systems.

The system described herein provides real advantages to any party dealing with large amounts of unstructured textual data, in enabling that party to analyze the contents of such data, identify categories of text found with some frequency within the data in an exploration session, train automated text categorization engines within a training session and provide ongoing performance evaluations during the training process. It further provides a means for publishing these classifiers so that they automatically recognize future instances of messages matching these categories, and for writing programs to respond automatically to those messages as they are recognized.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A computer implemented method for identifying a set of categories for unstructured text messages and training an automated classifier therefor, the method comprising:

from a stream of the unstructured text messages captured in computer readable form, selecting a subset thereof for presentation to a user as an exploration set, the subset selected from the stream by a programmed computer, wherein the selection of the exploration set is in a generally random manner though in accord with one or more set delimiting criteria provided by the user;

via a display of the programmed computer, providing the user with both (i) a reviewable presentation of each unstructured text message selected for presentation as part of the exploration set and (ii) a flag definition and assignment interface, whereby the user defines categories for the unstructured text messages and flags at least one message of the exploration set as associated with each of the categories so defined;

via the display of the programmed computer, providing the user with a reviewable presentation of a training subset of the unstructured text messages, wherein each of the unstructured text messages of the training subset is presented together with a category selection interface whereby the user accumulates, for each of at least a subset of the categories, a respective pool of training instances from the training subset for use in training an automated classifier; and training an automated classifier to classify individual ones of the unstructured text messages using the training subset.

2. The method of claim 1, further comprising:
successively refining the training of the automated classifier based on successive additions, by the user using the selection interface, of further unstructured text messages to the training subset; and
evaluating the successively refined training by applying the automated classifier to an audit subset of the unstructured text messages.

3. The method of claim 2, further comprising:
via the display, providing the user with a reviewable presentation of the audit subset of unstructured text messages, wherein each of the unstructured text messages of the audit subset is presented together with the category selection interface whereby the user accumulates, for each of at least a subset of the categories, a respective pool of audit instances from the audit subset for use in the evaluating.

4. The method of claim 3, further comprising:
successively performing the evaluating of the automated classifier based on successive additions, by the user using the selection interface, of further unstructured text messages to the audit subset.

5. The method of claim 2, further comprising:
forgoing further successive refining of the training, based on performance of the automated classifier against the audit subset.

6. The method of claim 1, further comprising:
computing from the unstructured text messages of the exploration set a lexical listing of words that appear in the exploration set at frequencies greater than statistically expected based on a background corpus of textual content,
wherein the flag definition and assignment interface includes a selectable presentation of the lexical listing whereby the user may specify at least some of the categories based thereon.

7. The method of claim 1, further comprising:
applying the trained, automated classifier to a second stream of the unstructured text messages.

8. The method of claim 7, wherein the stream and the second stream are one of
a same stream;
initial and subsequent samples of messages from same or equivalent streams; and
different streams having statistically similar distributions of features.

9. The method of claim 7, further comprising:
deploying the trained, automated classifier as a text categorization engine on a second programmed computer.

10. The method of claim 1,
wherein the user includes one or more human analysts.

11. The method of claim 1,
where the programmed computer includes one or more computational systems programmed to perform respective steps of the method.

12. The method of claim 1,
wherein the reviewable presentation of the training subset of the unstructured text messages provides a next page control that adds as training instances those unstructured text messages of a current page for which categories have been selected.

13. The method of claim 12,
wherein the next page control is implemented as a button.

14. The method of claim 12, further comprising:
based on successive selections of the next page control, successively refining the training of the automated classifier based on successive additions of further unstructured text messages to the training subset.

15. A computer implemented method for identifying a set of categories for unstructured text messages and training an automated classifier therefor, the method comprising:
from a stream of the unstructured text messages captured in computer readable form, selecting a subset thereof for presentation to a user as an exploration set, the subset selected from the stream by a programmed computer;
via a display of the programmed computer, providing the user with both (i) a reviewable presentation of each unstructured text message selected for presentation as part of the exploration set and (ii) a flag definition and assignment interface, whereby the user defines categories for the unstructured text messages and flags at least one message of the exploration set as associated with each of the categories so defined;
via the display of the programmed computer, providing the user with a reviewable presentation of a training subset of the unstructured text messages, wherein each of the unstructured text messages of the training subset is presented together with a category selection interface whereby the user accumulates, for each of at least a subset of the categories, a respective pool of training instances from the training subset for use in training an automated classifier;
training an automated classifier to classify individual ones of the unstructured text messages using the training subset;
successively refining the training of the automated classifier based on successive additions, by the user using the selection interface, of further unstructured text messages to the training subset;
evaluating the successively refined training by applying the automated classifier to an audit subset of the unstructured text messages; and
via the display, providing the user with a reviewable presentation of the audit subset of unstructured text messages, wherein each of the unstructured text messages of the audit subset is presented together with the category selection interface whereby the user accumulates, for each of at least a subset of the categories, a respective pool of audit instances from the audit subset for use in the evaluating,
wherein unstructured text messages from the audit and training subsets as well as respective category selections therefor are presented in a uniform manner, such that the user is generally not aware of which unstructured text messages comprise the audit subset and which unstructured text messages comprise the training subset.

16. A computer implemented method for identifying a set of categories for unstructured text messages and training an automated classifier therefor, the method comprising:
from a stream of the unstructured text messages captured in computer readable form, selecting a subset thereof for presentation to a user as an exploration set, the subset selected from the stream by a programmed computer;

via a display of the programmed computer providing the user with both (i) a reviewable presentation of each unstructured text message selected for presentation as part of the exploration set and (ii) a flag definition and assignment interface, whereby the user defines categories for the unstructured text messages and flags at least one message of the exploration set as associated with each of the categories so defined;

via the display of the programmed computer, providing the user with a reviewable presentation of a training subset of the unstructured text messages, wherein each of the unstructured text messages of the training subset is presented together with a category selection interface whereby the user accumulates, for each of at least a subset of the categories, a respective pool of training instances from the training subset for use in training an automated classifier;

training an automated classifier to classify individual ones of the unstructured text messages using the training subset; and successively refining the training of the automated classifier based on successive additions, by the user using the selection interface, of further unstructured text messages to the training subset; and evaluating the successively refined training by applying the automated classifier to an audit subset of the unstructured text messages, wherein the training subset and the audit subset are disjoint sets of unstructured text messages drawn from the exploration set in a manner generally not perceivable by the user.

17. A system comprising:

a store of unstructured text messages captured in computer readable form;

a computer coupled to the store and programmed to select and present a subset of the unstructured text messages to a user as an exploration set;

the programmed computer providing the user with both (i) a reviewable presentation of each unstructured text message selected for presentation as part of the exploration set and (ii) a flag definition and assignment interface, whereby the user defines categories for the unstructured text messages and flags at least one message of the exploration set as associated with each of the categories so defined;

the programmed computer further providing the user with a reviewable presentation of a training subset of the unstructured text messages, wherein each of the unstructured text messages of the training subset is presented together with a category selection interface whereby the user accumulates, for each of at least a subset of the categories, a respective pool of training instances from the training subset for use in training an automated classifier;

the programmed computer training an automated classifier to classify individual ones of the unstructured text messages using the training subset, wherein the programmed computer successively refines the training of the automated classifier based on successive additions, by the user using the selection interface, of further unstructured text messages to the training subset, and wherein the programmed computer evaluates the successively refined training by applying the automated classifier to an audit subset of the unstructured text messages;

the programmed computer further providing the user with a reviewable presentation of the audit subset of unstructured text messages, wherein each of the unstructured text messages of the audit subset is presented together with the category selection interface whereby the user accumulates, for each of at least a subset of the categories, a respective pool of audit instances from the audit subset for use in the evaluating; and wherein the selection interface includes a next page control, wherein for those unstructured text messages of the training pool for which categories have been selected on a current page, the next page control adds as training instances corresponding unstructured text together with the categories selected by the user therefor, and initiates a retraining of the automated classifier therewith, and wherein for those unstructured text messages of the audit pool for which categories have been selected on a current page, the next page control adds as audit instances corresponding unstructured text together with the categories selected by the user therefor, and initiates classification of unstructured text messages from the newly added-to audit pool using the retrained automated classifier.

18. The system of claim 17,
wherein the programmed computer successively performs the evaluating of the automated classifier based on successive additions, by the user using the selection interface, of further unstructured text messages to the audit subset.

19. The system of claim 17, further comprising:
a second programmed computer hosting a text categorization engine to which the trained, automated classifier is deployed.

20. The system of claim 17,
wherein the reviewable presentation of the training subset of the unstructured text messages provides a next page control that adds as training instances those unstructured text messages of a current page for which categories have been selected.

21. The system of claim 20,
wherein the next page control is implemented as a button.

22. The system of claim 20, further comprising:
based on successive selections of the next page control, successively relining the training of the automated classifier based on successive additions of further unstructured text messages to the training subset.

23. A computer implemented method for identifying a set of categories for unstructured text messages and training an automated classifier therefor, the method comprising:

from a stream of the unstructured text messages captured in computer readable form, selecting a subset thereof for presentation to a user as an exploration set, the subset selected from the stream by a programmed computer;

via a display of the programmed computer, providing the user with both (i) a reviewable presentation of each unstructured text message selected for presentation as part of the exploration set and (ii) a flag definition and assignment interface, whereby the user defines categories for the unstructured text messages and flags at least one message of the exploration set as associated with each of the categories so defined;

via the display of the programmed computer, providing the user with a reviewable presentation of a training subset of the unstructured text messages, wherein each of the unstructured text messages of the training subset is presented together with a category selection interface whereby the user accumulates, for each of at least a subset of the categories, a respective pool of training instances from the training subset for use in training an automated classifier;

training an automated classifier to classify individual ones of the unstructured text messages using the training subset;

successively refining the training of the automated classifier based on successive additions, by the user using the selection interface, of further unstructured text messages to the training subset;

evaluating the successively refined training by applying the automated classifier to an audit subset of the unstructured text messages; and via the display, providing the user with a reviewable presentation of the audit subset of unstructured text messages, wherein each of the unstructured text messages of the audit subset is presented together with the category selection interface whereby the user accumulates, for each of at least a subset of the categories, a respective pool of audit instances from the audit subset for use in the evaluating, wherein the user interface selection includes a next page control, wherein for those unstructured text messages of the training pool for which categories have been selected on a current page, the next page control adds as training instances corresponding unstructured text together with the categories selected by the user therefor, and initiates a retraining of the automated classifier therewith, and wherein for those unstructured text messages of the audit pool for which categories have been selected on a current page, the next page control adds as audit instances corresponding unstructured text together with the categories selected by the user therefor, and initiates classification of unstructured text messages from the newly added-to audit pool using the retrained automated classifier.

* * * * *